United States Patent [19]
Kidd et al.

[11] 3,754,397

[45] Aug. 28, 1973

[54] COLLOID ENGINE BEAM THRUST VECTORING

[75] Inventors: Philip W. Kidd, Palos Verdes Peninsula; Norman E. Law, Cypress, both of Calif.

[73] Assignee: TRW Inc., Redondo Beach, Calif.

[22] Filed: Oct. 23, 1970

[21] Appl. No.: 83,486

[52] U.S. Cl. .................................. 60/202, 60/230
[51] Int. Cl. ............................................ H05h 5/00
[58] Field of Search .................. 60/203, 202, 228, 60/230, 256

[56] References Cited
UNITED STATES PATENTS

| | | | |
|---|---|---|---|
| 3,122,882 | 3/1964 | Schultz | 60/202 |
| 3,535,880 | 10/1970 | Work et al. | 60/230 X |
| 2,880,337 | 3/1959 | Langmuir et al. | 60/202 |
| 3,273,337 | 9/1966 | Bolieau | 60/256 |
| 3,071,154 | 1/1963 | Cargill et al. | 60/230 |
| 3,304,718 | 2/1967 | Webb | 60/202 |
| R26,177 | 3/1967 | Deutsch | 60/202 |
| 3,537,266 | 11/1970 | Mahadevan et al. | 60/202 |
| 3,238,715 | 3/1966 | Reader et al. | 60/202 |
| 3,286,467 | 11/1966 | Hunter | 60/202 |
| 3,233,404 | 2/1966 | Huber et al. | 60/202 |
| 3,512,362 | 5/1970 | Daley | 60/202 |

Primary Examiner—Carlton R. Croyle
Assistant Examiner—Robert E. Garrett
Attorney—Daniel T. Anderson, Donald W. Graves and William B. Leach

[57] ABSTRACT

To provide thrust vectoring in a colloid beam engine, a plurality of deflector electrodes surround the colloid needles upstream of the extractor. To change the direction of the colloid beam, a bias voltage is applied to the deflector electrodes whereby to vary the thrust vector of the colloid beam.

3 Claims, 4 Drawing Figures

Patented Aug. 28, 1973  3,754,397

Philip W. Kidd
Norman E. Law
INVENTORS

BY *Donald W. Trane*

ATTORNEY

COLLOID ENGINE BEAM THRUST VECTORING

BACKGROUND OF THE INVENTION

This invention relates to a thrust producing device such as a rocket engine. Rocket engines consist of many various types such as the conventional bipropellant or monopropellant engine, a solid propellant engine and the hybrid engine which uses a monoliquid or gaseous propellant and a solid propellant.

Other types of engines include the nuclear engine which operates by heating a propellant such as hydrogen by means of a nuclear source. Another type of engine which has been utilized is the plasma engine which forces ions of a gaseous plasma material into space thus producing thrust.

The choice of which type of rocket engine to use for various applications depends on various factors. One of these factors is expense. Another factor may be whether the engine is to be used as a booster to lift a rocket off the ground while another factor is the specific performance of the various engines particularly when considered as a trade off between the desired specific performance and the weight of the engine and expense and whether the engine is operated under vacuum conditions or in the booster phase.

Still another type of engine is the so called colloid beam engine which operates under the principle of providing an electrical bias on a liquid propellant containing or consisting of a metal whereby the propellant is accelerated thus providing thrust for the engine. The advantage of the colloid beam type engine is the high specific performance obtained therefrom in space applications, particularly over long periods of time.

One of the desired capabilities of a rocket engine and in particular a colloid beam engine is the ability to vary the thrust vector. That is, to change the direction of thrust whereby a spacecraft can be maneuvered where desired.

Previous attempts to provide thrust vectoring of a colloid beam engine includes mechanically vectoring the engine itself whereby to change the direction of thrust. This has inherent problems, however, in that a relatively heavy mechanical complicated vectoring system must be provided to physically change the direction of thrust which consists in moving the engine itself or at least a portion thereof.

Another approach to providing thrust vectoring of the colloid beam engine has been to provide an electrostatic deflection of the charged particle beam. This has been done by placing plates downstream of the extractor plate of the colloid engine itself and applying a voltage to the plates. The problem with this construction is that in order to get reasonable thrust vector deflections, the plates must extend a considerable distance downstream from the engine which adds considerable weight to the module and in addition renders the plates unprotected from secondary currents produced downstream.

SUMMARY OF THE INVENTION

This invention can be summarized as comprising a colloid thrustor engine which has at least one propellant feed needle and an extractor plate having apertures therein which is adapted to accelerant the propellant from the needle through the apertures in the plate in response to a voltage bias on the plate relative to the needle and in addition which includes at least one deflector electrode located adjacent at least one side of the needle upstream of the propellant flow through the extractor plate and which is adapted to have a voltage bias applied to the deflector electrode whereby the propellant vector is varied at will depending upon the bias applied to the deflector plate in relationship to the needle voltage and the extractor plate voltage.

DESCRIPTION OF THE PREFERRED EMBODIMENTS

Figure 4:
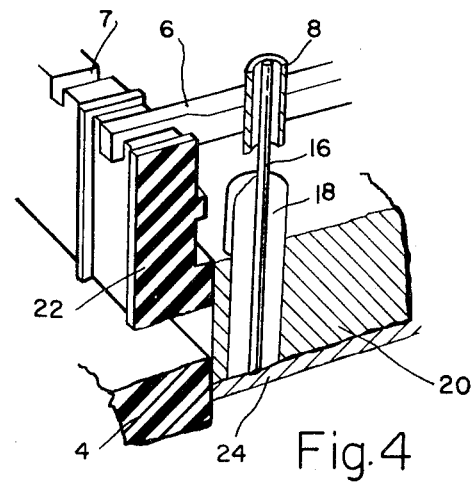

Shown generally at 2 is a colloid beam thrustor constructed according to this invention. This colloid beam engine has an outer casing 4 which is typically constructed of a material such as an epoxy resin. This support or outer container supports the various vector electrode supports 6 which typically are constructed of a metal such as copper or stainless steel. This is more clearly seen in FIG. 4. One of these vector electrode supports is shown supporting one of the various vector electrodes 8. Additional supports are held in slots 7. Also supported by container 4 is the extractor plate 12 which is also constructed of a metal such as stainless steel and has a plurality of apertures 14 therein. Each of these apertures is aligned with the vector electrodes 8 and 10 and needles 16 which are supported by needle holders 18 which are typically constructed of copper. The needles themselves are constructed of platinum iridium tubing which is soft soldered in the holder 18. The needle holders 18 are in turn encased in a base plate 20 which is held in place both by container 4 and an insulator 22 constructed of a material such as teflon.

Figure 1:
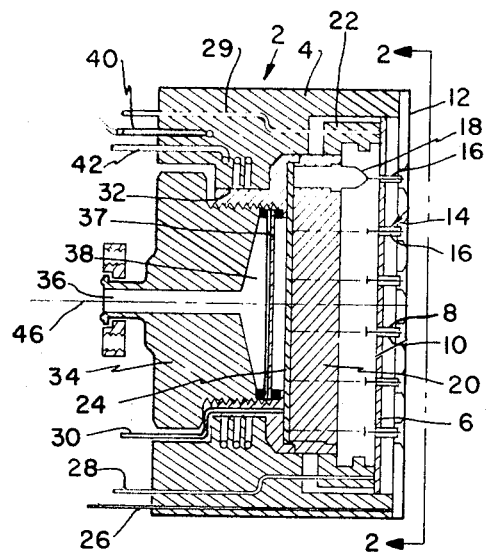
FIG. 1 is a view partially in cross section of a colloid engine constructed according to this invention as viewed along the lines 1—1 of FIG. 2.

A plurality of metallic conductors 24 are attached to base plate 20. A bias line or conductor 26 leads through insulator or outer container 4 to the extractor plate 12, while vector bias lines 28 and 29 are connected to the various vector electrode metal supports. Leads 30 are in a similar fashion connected to conductors 24 whereby to provide a bias to the needle holders and in turn to the needles 16. An annular ring 32 is provided which may be constructed of metal. If so, lead 30 would be merely connected thereto rather than extending through the base plate layer 24, but if constructed of an insulator would be as shown in FIG. 1. This annular ring in turn supports the structural member 34 which contains a propellant passage 36. A plenum chamber 38 is shown which contains a millipore filter 37 to prevent sedimentation in the needles and in the example shown is a 1.5 micron filter. There are six longitudinal bars 24 each of which are connected to six needles 16 through supports 18.

A thermocouple 40 is provided to measure the temperature and a heater element 42 is shown to heat the engine. When a propellant such as NaI-glycerol is used, the viscosity changes by approximately 10 percent for a 2° C variation around the temperature of 24° C. Therefore, a thermocouple and heating element is provided to maintain the temperature at a relatively constant level.

In normal operations of engines of this type, a propellant is introduced into line 36, chamber 38 and through millipore filter 37 and thence past bars 24 and through needles 16. A positive bias from a source not shown through lead 30 biases bars 24, needle holders 18 and needles 16 at a high positive bias such as approximately 7 kilivolts. This figure is not critical but is given as an example only.

Figure 2:
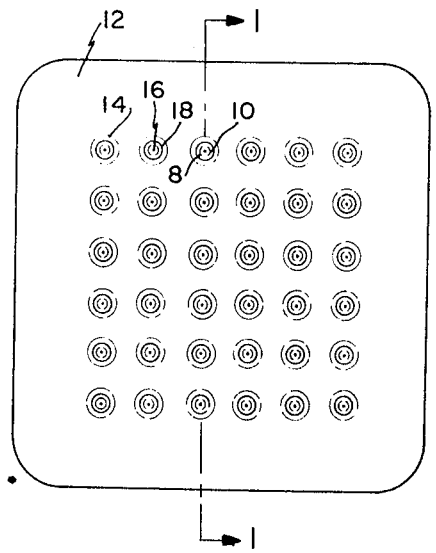
FIG. 2 is a view of the downstream end of the colloid engine as viewed along the lines 2—2 of FIG. 1.
Figure 3:
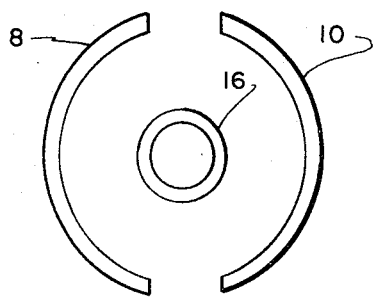
FIG. 3 is an enlarged view looking along the axis of one of the colloid needles surrounded by the vector electrodes and FIG. 4 is a view partially in cross section illustrating the arrangement of a single needle and a single vector electrode.

In turn, the extractor plate 12, by means of bias 26, is maintained at a negative voltage such as minus 300 volts. When propellant is fed through conduit 36 under a relatively slight pressure, the negative bias of extractor plate 12, in combination with the positive bias of the liquid propellant which may consist of NaI-glycerol or glycerol-KI or other liquid metals such as cesium or gallium will be accelerated at a high rate and pass out through needle 16 to provide thrust. As an example, utilizing a single module such as shown in FIG. 2 which contains 36 needles, a combination of eight modules resulting in 288 needles with a thrust of 2.5 micro pounds per needle will result in a specific performance at approximately 1,000 – 2,000 seconds with a power expenditure of 23 watts. Specific performance is defined as the ratio of the thrust measured in pounds divided by the mass flow rate, measured in pounds of the propellant per unit of time (seconds). This is a common measure of performance of a rocket engine and is commonly known as Isp.

Thus far described, the operation of this engine is relatively convention. As previously stated, it is often desirable to have an engine which can be vectored so as to change the direction of thrust. The methods heretofore proposed have been relatively unsatisfactory and the disadvantages of these methods have been overcome by the instant invention.

Lines 28 and 29 (six of each) are each connected to alternate vector electrodes 8 and 10. The voltage divider network, not shown, is provided whereby the bias difference between the vector electrodes 8 and 10 is roughly 1/7 that of the voltage bias applied to the needles 16. Thus, in the instant example, there would be a voltage difference of roughly 1 kilovolt between the vector electrodes 8 and 10. When this bias is applied, the colloid beam exiting needle 16 will be at an angle different from the axis of the colloid thrustor as shown by line 46. This provides a vectoring effect and is capable of changing the direction of thrust of the engine. Since there is no drainage of current between the vector electrodes, the power requirements are essentially zero.

In addition to the capability of deflecting the colloid beam, the vector electrodes can also be used to focus and stabilize the beam as well as adjusting the Isp.

What is claimed is:

1. In a colloid thruster engine having a plurality of propellant feed needles and an extractor plate having a like plurality of aperatures each associated with one of said plurality of needles and adapted to accelerate propellant from said plurality of needles through said like pluraltiy of aperatures in said plate in response to a voltage bias between said plate and said plurality of needles, that improvement which comprises:

a plurality of deflector electrodes each located adjacent one side of one said plurality of needles at a point upstream of the propellant flow through said extractor plate, each said deflector electrode being adapted to have a voltage bias applied thereto; whereby the direction of the propellant vector is varied so as to vary the direction of the thrust vector of the engine.

2. A method of providing thrust to a colloid thruster engine which comprises:

introducing an electrical conductive propellant at a high positive voltage bias through a plurality of needles toward an extractor plate at a negative bias, the resultant colloid beam thereby producing a thrust vector; and applying the field of an intermediate voltage bias to at least one of the plurality of needles at a point upstream of the propellant flow through the extractor plate; whereby the direction of the colloid beam is varied so as to vary the direction of the thrust vector of the engine.

3. A method according to claim 2 in which said intermediate voltage bias may be varied so as to vary the thrust vector of said colloid beam.

* * * * *